July 28, 1959 J. P. JONES, JR 2,897,378

SEMI-CONDUCTOR SIGNAL TRANSLATING CIRCUITS

Filed Dec. 14, 1955

INVENTOR.
JOHN PAUL JONES, JR

United States Patent Office 2,897,378

Patented July 28, 1959

2,897,378

SEMI-CONDUCTOR SIGNAL TRANSLATING CIRCUITS

John Paul Jones, Jr., Pottstown, Pa., assignor to Navigation Computer Corporation, a corporation of Pennsylvania Application December 14, 1955, Serial No. 553,173

3 Claims. (Cl. 307—88.5)

This invention relates in general to semi-conductor signal translating circuits and in particular to means for obtaining relatively high frequency response circuit operation of signal translating circuits utilizing transistors.

For many circuit applications, computer systems being an example, a relatively high frequency response is required or desired. The typical transistor, however, has a relatively low frequency response which may make its use for such applications unsatisfactory. For this reason, techniques have been developed in the fabrication and manufacture of transistors for improving their frequency response. These techniques, while tending to improve the frequency response, are relatively expensive, and may appreciably increase the cost of the transistor.

It is accordingly an object of this invention to provide circuit means in transistor signal translating circuits for obtaining a relatively high frequency response.

It is another object of this invention to provide relatively high frequency response operation of signal translating circuits utilizing transistors while maintaining reliable and stable circuit operation.

It is a still further object of the present invention to provide, in transistor pulse amplifier circuits, a relatively high frequency response with a minimum number of circuit components.

These and further objects and advantages of the present invention are achieved by driving a transistor into saturation by the application of a high amplitude pulse of one polarity and then applying a pulse of an opposite polarity to the transistor. The second pulse reduces the output current very rapidly. In a transistor circuit of the common or grounded emitter type this type operation is achieved, in accordance with the invention, by connecting a damped parallel resonant circuit with the base or input electrode of the transistor. Upon the application of an input pulse, a waveform of the correct type to initially drive the transistor into saturation and to subsequently reduce the transistor output current is provided. Upon application of this waveform to the transistor, an output pulse of rapid rise and fall time may be derived from the circuit.

Figure 1:
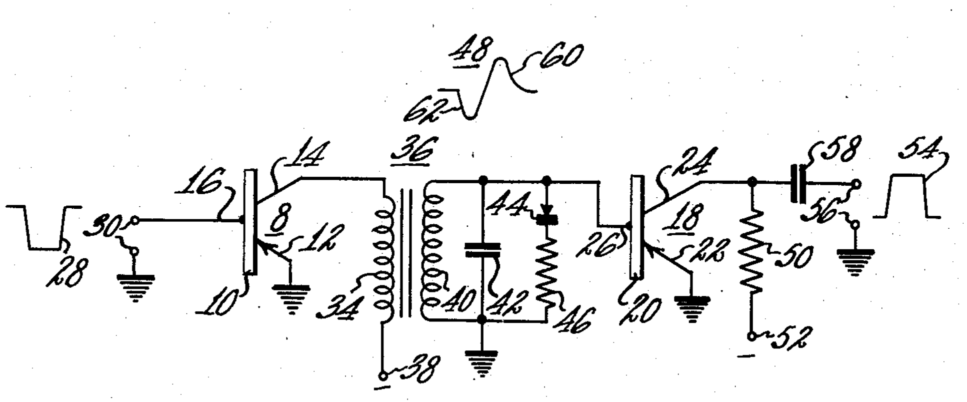
Figure 2:
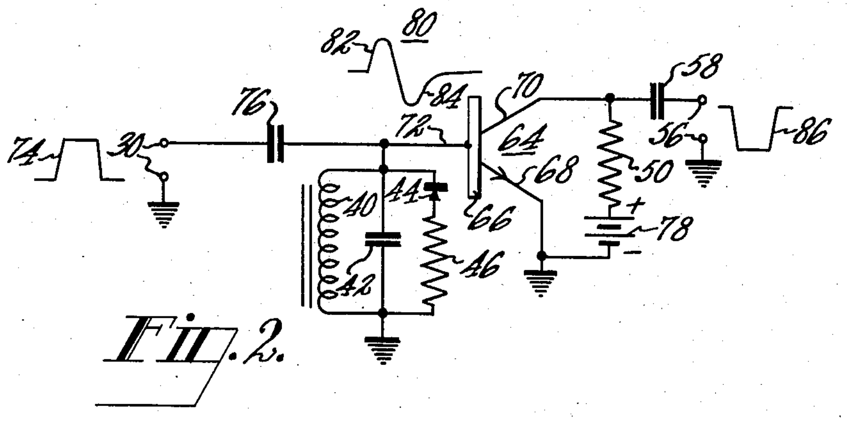
Figure 3:
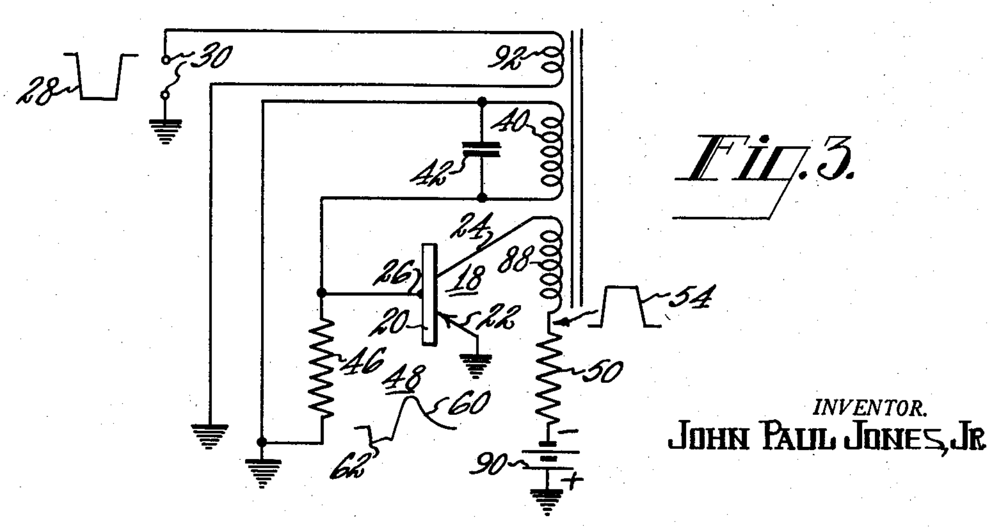

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1, 2, and 3 are schematic circuit diagrams of transistor signal translating circuits embodying the invention.

Referring now to the drawing, wherein like parts are indicated by like reference numerals throughout the figures, and referring particularly to Figure 1, a two-stage signal translating circuit embodying the invention includes an input transistor 8 and an output transistor 18. The transistors 8 and 18 may be considered to be junction transistors of the P–N–P type, and they each include a semi-conductive body with which three electrodes are cooperatively associated in a well known manner. Thus the transistor 8 includes a semi-conductive body 10 and an emitter 12, a collector 14, and a base electrode 16. Similarly, the transistor 18 includes a semi-conductive body 20 with which an emitter 22, a collector 24, and a base 26 are cooperatively associated. To apply an input pulse, illustrated as a negative pulse 28, to the circuit, a pair of input terminals 30 are provided, one of which is grounded and the other of which is connected to the base 16 of the first transistor 8.

The first transistor 8 is connected in the so-called common or grounded emitter circuit configuration. To this end, its emitter 12 is connected directly to a point of reference potential or circuit ground. To supply collector biasing potentials to the transistor 8, the collector 14 is connected through the primary winding 34 of an interstage coupling transformer 36 to a terminal 38 of a negative supply source. The interstage coupling transformer further includes a tuned secondary comprising a parallel resonant circuit including a secondary winding 40 and a capacitor 42 connected in parallel.

The tuned or resonant secondary is damped, in accordance with the invention, to provide the proper waveform for achieving the desired high frequency response operation. To this end, a semi-conductor diode 44 and a resistor 46 are connected in series with each other and across the secondary winding 40 and the capacitor 42. The diode 44 is poled for forward conduction in the same direction as normal emitter-to-base current flow of the transistor 18. The waveform 48 so produced is applied to the base 26 of the output transistor 18 by a connection from the anode of the diode 44 directly to the base 26.

The output transistor 18 is also of the common or grounded emitter configuration and has its emitter 22 grounded. The collector 24 of the output transistor is connected through a collector load resistor 50 to a terminal 52 of a negative supply source. To derive an output pulse from the circuit, for example, a positive output pulse 54, a pair of output terminals 56 are provided. One of the output terminals 56 is grounded while the other is connected through a coupling capacitor 58 to the collector 24 of the output transistor 18.

The resistance of the damping resistor 46 is chosen, in accordance with the invention, so as to obtain a waveform of the type illustrated by the waveform 48. In general, this resistance may be determined for the desired circuit operation by the equation:

$$R_d=0.5\sqrt{\frac{L}{C}}$$

where:

$R_d$=resistance of the resistor 46,
$L$=inductance of the secondary winding 40, and
$C$=capacity of the capacitor 42.

The resonant frequency of the tuned secondary is chosen so that its half sinewave interval is approximately equal to the duration of the pulse which is applied to it. The damping resistor 46 loads the tuned secondary when the diode 44 conducts on the positive cycle 60 of the waveform 48. By the proper selection of the resistance of the damping resistor 46, therefore, the waveform 48, which is applied to the base 26, will comprise a negative half sinusoid 62 and the single positive half sinusoid 60, which has an energy content substantially equal to that of the first half cycle wave 62.

Application of the negative portion 62 of the waveform 48 to the base 26 of the transistor 18 will drive the transistor 18 into a condition of collector saturation. The output wave 54 therefore increases rapidly in a positive direction. Minority charge carries or "holes" are stored in the base region of the transistor 8 during this cycle of the circuit operation. Upon the application of the positive portion 60 of the waveform 48 to the base 26, the stored holes are rapidly cleared from the base region and the transistor is rapidly placed in a condition of collector current cut-off. This produces a positive substantially square wave pulse 54 at the output terminals 56. This pulse is characterized, by provision of the invention, by rapid rise and fall times. Accordingly, the frequency response of the circuit is superior.

Moreover, by using a damped interstage coupling circuit the proper impedance match between the output of the first transistor 8 and the input of the second transistor 18 is maintained. In addition, circuit operation is stable and reliable and the width of the output pulse 54 is standardized.

In Figure 2, reference to which is now made, the invention is embodied in an alternating current coupled transistor circuit. The circuit includes a transistor 64 of P type conductivity which may be considered to be an N–P–N junction transistor. The transistor 64 includes a semi-conductive body 66 with which an emitter 68, a collector 70, and a base 72 are cooperatively associated in a well known manner. Since the transistor 64 is of P type conductivity, that is, it is of an opposite conductivity type to the transistors 8 and 18 of Figure 1, the pulse 74 which is applied to the input terminals 30 is of positive polarity. One of the input terminals 30 is grounded and the other is connected through a coupling capacitor 76 to the base 72 of the transistor 64.

To provide the proper waveform for achieving a high frequency response for the transistor 64, a damped parallel resonant circuit is connected from the junction of the coupling capacitor 76 and the base electrode 72 to ground. This circuit includes the parallel connection of the inductive winding 40, the capacitor 42, and the series combination of the diode 44 and the damping resistor 46. One difference between this circuit and its counterpart in Figure 1 is that since the transistor 64 is of P type conductivity, the diode 44 is poled in an opposite direction to its direction in Figure 1. The transistor 64 is of the common emitter configuration, its emitter 68 being grounded. Collector biasing potentials for the transistor 64 are provided by a battery 78, the negative terminal of which is grounded and the positive terminal of which is connected through the collector load resistor 50 to the collector 70 of the transistor 64.

The resistance of the damping resistor 46 is chosen in the same manner as described in connection with Figure 1. In operation, the damped parallel resonant circuit provides, upon the application of this input pulse 74, a waveform 80 which is similar to the waveform 48 of Figure 1 but of an opposite polarity. The waveform 80 includes a positive portion 82 which drives the transistor 64 into saturation, and an immediately following negative portion 84 which quickly cuts off the collector current flow. As a result, a negative pulse 86 is derived at the output terminals 56. This pulse is characterized by a fast rise time as well as a fast fall time in the same manner as the output pulse obtainable from the circuit illustrated in Figure 1.

To improve the sensitivity as well as the gain of the circuits embodying the invention, the circuit arrangement illustrated in Figure 3 may be utilized, reference to which is now made. This circuit includes the P–N–P junction transistor 18 which may be similar or identical to the like-referenced transistor of Figure 1. The emitter 22 of the transistor 18 is grounded while its collector 24 is connected through a feedback inductive winding 88 and the collector load resistor 50 to the negative terminal of a battery 90, the positive terminal of which is grounded. As in Figure 1, a damped parallel resonant circuit is connected with the base 26 of the transistor 18. This circuit includes the inductive winding 40, the parallel tuning capacitor 42, and the damping resistor 46. One difference in this circuit is the elimination of the diode 44 which is not essential to the operation of any of the circuits, particularly where the resistance of the damping resistor is large, although its use is to be preferred to conserve power on the driving cycle. The inductive winding 40 of the damped parallel resonant circuit is inductively coupled with the feedback winding 88 in the collector circuit of the transistor 18. Accordingly, regenerative signal feedback is provided between the collector 24 and the base 26 of the transistor 18. This adds to the sensitivity of the circuit and increases the circuit gain. To provide isolation for the circuit, an isolation winding 92 is provided which is serially connected between the input terminals 30, to which the negative input pulse 28 is applied. The isolation winding 92 is inductively coupled with the winding 40 of the damped parallel resonant circuit.

In operation, the resistance of the damping resistor 46 is chosen so that upon the application of the input pulse 28, the waveform 48 is produced at the base 26 of the transistor 18. In a manner similar to the operation of the preceding figures, this waveform serves to drive the transistor 18 into saturation and then quickly cut-off the flow of collector current flow. As a result, a positive output pulse 54 having fast rise and fall times may be derived from across the collector load resistor 50.

As described herein, the frequency response of transistor signal translating circuits embodying the invention is optimized. Accordingly, pulses having fast rise and fall times are obtainable from transistor signal translating circuits which require few components and relatively simple circuit connections. Moreover, reliable and stable circuit operations characterize the circuits embodying the invention.

What is claimed is:

1. A transistor signal translating circuit comprising, in combination, a transistor having a current gain of less than unity as defined by the ratio of collector current increments to base current increments and including base, emitter, and collector electrodes, means including an input terminal providing a source of input pulses of predetermined polarity, means coupling said input terminal with said base electrode, means providing a voltage wave in response to said input pulses having a first portion of said one polarity and a second portion of an opposite polarity, said last named means including a damped parallel resonant circuit connected between said base and emitter electrodes for applying said voltage wave to said base electrode through said coupling means to initially drive said transistor into saturation and for subsequently rapidly reducing the collector current flow of said transistor, and means for deriving an output voltage pulse of said opposite polarity and having a relatively rapid rise and fall time from said collector electrode.

2. A transistor signal translating circuit as defined in claim 1 wherein a serially connected diode and damping resistor are connected in parallel with said parallel resonant circuit.

3. A transistor signal translating circuit as defined in claim 2 wherein said parallel resonant circuit includes an inductor and a capacitor connected in parallel and said damping resistor has resistance substantially equal to one-half the square root of the ratio defined by the inductance of said inductor to the capacitance of said capacitor.

References Cited in the file of this patent

UNITED STATES PATENTS

| | | |
|---|---|---|
| 2,594,336 | Mohr | Apr. 29, 1952 |
| 2,705,287 | Lo | Mar. 29, 1955 |
| 2,745,012 | Felker | May 8, 1956 |
| 2,757,243 | Thomas | July 31, 1956 |

OTHER REFERENCES

Article entitled: "The Transistor Regenerative Amplifier as a Computer Element" by Chaplin, Proc. Inst. of Elec. Engr., October 1954, pp. 298–307.